US006895245B2

(12) United States Patent
Wallentin

(10) Patent No.: US 6,895,245 B2
(45) Date of Patent: *May 17, 2005

(54) TELECOMMUNICATIONS INTEREXCHANGE MEASUREMENT TRANSFER

(75) Inventor: Bo Stefan Pontus Wallentin, Ljungsbro (SE)

(73) Assignee: Telefonaktiebolaget LM Ericssion, Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,821

(22) Filed: Mar. 6, 1998

(65) Prior Publication Data

US 2001/0053695 A1 Dec. 20, 2001

(51) Int. Cl.[7] .............................................. H04Q 7/20
(52) U.S. Cl. ..................... 455/436; 455/450; 455/438; 455/444
(58) Field of Search ................................ 455/436, 437, 455/438, 439, 442, 453, 450, 434, 443, 440, 446

(56) References Cited

U.S. PATENT DOCUMENTS 5,101,501 A * 3/1992 Gilhousen et al. .......... 455/442
5,184,347 A * 2/1993 Farwell et al. .............. 370/350
5,267,261 A * 11/1993 Blakeney, II et al. ....... 370/332

(Continued)

FOREIGN PATENT DOCUMENTS

| WO | WO 95/08898 | 3/1995 |
| WO | WO 95/15665 | 6/1995 |
| WO | WO 95/20865 | 8/1995 |
| WO | 97/41698 | 11/1997 |

OTHER PUBLICATIONS

Cheung, et al, "Network Configurations for Seamless Support of CDMA Soft Handoffs Between Cell–Clusters", Dept. of Electrical Engineering, The University of British Columbia, 0–7803–3300–4/96 © 1996, pp. 295–299.

(Continued)

Primary Examiner—Erika Gary
Assistant Examiner—Temica M Davis
(74) Attorney, Agent, or Firm—Nixon & Vanderhye, P.C.

(57) ABSTRACT

Telecommunications network decision making (such as call admission and call congestion control) utilizes as input, not only information in the cell where the call is setup, but also cell condition information from cells which neighbor the cell where the call is setup. The cell condition information from neighboring cells is obtained even in situations in which the neighboring cell is controlled by another exchange, e.g., another radio network controller (RNC). In an illustrated embodiment, the cell condition information utilized by the decision making includes measured data taken over at least a multi-connection portion of cell, one example of which is radio interference information. The cell condition information utilized in the network decision making is transmitted between exchanges (e.g., between radio network controllers [RNCs]) using common channel signaling.

49 Claims, 8 Drawing Sheets

U.S. PATENT DOCUMENTS

| | | | | |
|---|---|---|---|---|
| 5,278,892 A | * | 1/1994 | Bollinger et al. | 445/442 |
| 5,432,780 A | * | 7/1995 | Smith et al. | 370/297 |
| 5,487,174 A | | 1/1996 | Persson | 455/444 |
| 5,497,504 A | * | 3/1996 | Acampora et al. | 455/436 |
| 5,517,674 A | * | 5/1996 | Rune | 455/437 |
| 5,530,917 A | * | 6/1996 | Anderson et al. | 455/436 |
| 5,594,781 A | * | 1/1997 | Kozdon et al. | 379/442 |
| 5,649,303 A | | 7/1997 | Hess et al. | 455/63 |
| 5,768,267 A | * | 6/1998 | Raith et al. | 370/329 |
| 5,857,154 A | | 1/1999 | Laborde et al. | 455/444 |
| 5,920,818 A | * | 7/1999 | Frodigh et al. | 455/443 |
| 5,930,721 A | * | 7/1999 | Fried et al. | 455/466 |
| 5,940,762 A | * | 8/1999 | Lee et al. | 455/442 |
| 5,987,332 A | | 11/1999 | Gettleman et al. | 455/518 |
| 6,052,605 A | | 4/2000 | Meredith et al. | 455/561 |
| 6,055,432 A | | 4/2000 | Haleem et al. | 455/452 |
| 6,226,520 B1 | | 5/2001 | Jeoung | 455/452 |
| 6,233,222 B1 | | 5/2001 | Wallentin | 370/229 |
| 6,405,043 B1 | | 6/2002 | Jensen et al. | 455/446 |

OTHER PUBLICATIONS

Jones, et al., IS–634 revision A—part 1 (IS–634.1 rev A) (PN–3539) 2nd Ballot Version—Draft for V&V, Part 1—Common Protocol and Part 5—Protocol Details, Oct. 27, 1997.

"Digital Cellular Telecommunications System (Phase 2+); Mobile Application Part (MAP) Specification (GSM 09.02 version 5.8.0)", European Telecommunications Standard Institute; Draft pr ETS 300 974, Feb. 1998.

"Cellular Radiotelecommunications Intersystem Operations", ANSI–41–D (Former (TIA/EIA IS–41–C), pp. 2–5–2–14, 2–25–2–30.

* cited by examiner

TELECOMMUNICATIONS INTEREXCHANGE MEASUREMENT TRANSFER

This patent application is related to U.S. patent application Ser. No. 09/035,788 of Wallentin filed simultaneously, entitled "Telecommunications Inter-Exchange Congestion Control", and and U.S. patent application Ser. No. 09/036,391 filed simultaneously, entitled "System and Method used in a Mobile Telecommunications Network for Load Balancing Ongoing Calls between Different Base Station", both of which are incorporated herein by reference.

BACKGROUND

1. Field of the Invention

The present invention pertains to cellular telecommunications, and particularly to a transfer of measurement information between exchanges of a mobile telecommunications system.

2. Related Art and other Considerations

In mobile telecommunications, a mobile station (MS) such as mobile telephone communicates over radio channels with base stations. Each base station usually transmits and receives signals over selected radio channels for a particular geographic region known as a cell. The cell often is subdivided into several sectors. Typically a plurality of base stations are connected to a base station controller node, also known as an exchange or a radio network controller node (RNC). One or more RNCs are, in turn, connected to or included with a mobile switching center (MSC). The mobile switching center is usually connected, e.g., via a gateway, to other telecommunication networks, such as the public switched telephone network or to a packet-data network such as the Internet.

FIG. 1 shows a radio access network (RAN) 20 which comprises radio network controllers (RNC) $22_1$ and $22_2$ respectively connected to mobile switching centers (MSC) $24_1$ and $24_2$. Radio network controller (RNC) $22_1$ is connected to base stations (BS) $26_{1,1}$, $26_{1,2}$, and $26_{1,3}$; radio network controller (RNC) $22_2$ is connected to base stations (BS) $26_{2,1}$, $26_{2,2}$, and $26_{2,3}$. The radio network controllers (RNC) $22_1$ and $22_2$ are connected by an inter-RNC transport link 32.

In a code division multiple access (CDMA) mobile telecommunications system, the information transmitted between a base station and a particular mobile station is modulated by a mathematical code (such as spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications*, Prentice Hall (1997).

In addition, in CDMA mobile communications, typically the same baseband signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high. This utilization of radio channels to/from multiple base stations by a mobile station, such as occurs in a CDMA scheme for example, is termed "soft handover" or "macro diversity."

At the moment shown in FIG. 1, and for reasons summarized above, mobile station MS is shown in FIG. 1 as having radio communication with two base stations, particularly base stations $26_{1,2}$, and $26_{1,3}$. The lines $28_{1,2}$ and $28_{1,3}$ each represent a communication path. Specifically, line $28_{1,2}$ depicts both the radio channel from mobile station MS to base station BS $26_{1,2}$ and the land line link channel from base station BS $26_{1,2}$ to radio network controller (RNC) $22_1$; line $28_{1,3}$ depicts both the radio channel from mobile station MS to base station BS $26_{1,3}$ and the land line link channel from base station BS $26_{1,2}$ to radio network controller (RNC) $22_1$. In the case of both lines $28_{1,2}$ and $28_{1,3}$, the land line link is connected to a diversity handover unit (DHU) $30_1$ of radio network controller (RNC) $22_1$.

Thus, as depicted with reference to FIG. 1, the mobile connection with mobile station MS potentially utilizes several "legs", each leg being represented by the lines $28_{1,2}$ and $28_{1,3}$ in the case of mobile station MS of FIG. 1. As the overall connection between mobile station MS and any other party is viewed, the diversity handover unit (DHU) $30_1$ serves essentially both to combine and split the different legs utilized by a mobile station. The splitting occurs in the sense that information directed toward the mobile station is directed along the plural parallel legs to differing base stations. Information received from a base station may actually be obtained through several of the legs (e.g., from several base stations), in which sense the diversity handover unit (DHU) $30_1$ serves a combining function. Operations performed by a diversity handover unit are understood, for example, with reference to copending U.S. patent applications Ser. No. 08/979,866, filed Nov. 26, 1997 and entitled "MULTISTAGE DIVERSITY HANDLING FOR CDMA MOBILE TELECOMMUNICATIONS", which is incorporated herein by reference.

FIG. 1 illustrates the simple case in which the different legs of the connection, represented by lines $28_{1,2}$ and $28_{1,3}$, are for base stations BS all of which are connected to radio network controller (RNC) $22_1$. However, should the mobile station MS travel sufficiently to pick up signals from another base station, e.g., into or proximate a cell handled by another base station, such as base station BS $26_{2,1}$, for example, a more complex situation occurs as shown in FIG. 1A.

The situation depicted in FIG. 1A introduces the concept of a border 31 between groups of cells controlled by base stations which are, in turn, controlled by different RNCs. In FIG. 1A, the mobile station MS communicates not only through the leg represented by line $28_{1,3}$, but now also by the leg represented by line $28_{2,1}$. The leg represented by line $28_{2,1}$ includes the radio link between mobile station MS and base station BS $26_{2,1}$, as well as the information pertinent to the mobile connection which is carried over inter-RNC transport link 32.

Thus, in the situation depicted in FIG. 1A, the mobile connection involving mobile station MS employs base stations belonging to differing radio network controllers (RNC). Such situation involves a different type of handover—an inter-RNC soft handover. Inter-RNC softhandovers are made between two or several RNCs. In the particular situation shown in FIG. 1A, an inter-RNC soft handover is made between radio network controller (RNC) $22_1$, which is also known as the "Source" RNC, and radio network controller (RNC) $22_2$, which is also known as the "Target" RNC. Radio network controller (RNC) $22_1$ is the Source RNC since it has current control of the mobile radio connection. The Target RNC is an RNC, other than the Source RNC, that has, or has been decided to have, base stations utilized by the mobile radio connection.

The inter-RNC transport link 32 which connects the radio network controllers (RNC) $22_1$ and $22_2$ facilitates, e.g., the inter-RNC soft-handovers. Inter-RNC transport link 32 is utilized for the transport of control and data signals between Source RNC $22_1$ and Target RNC $22_2$, and can be either a direct link or a logical link as described, for example, in International Application Number PCT/US94/12419 (International Publication Number WO 95/15665).

International Application Number PCT/FI94/00038 (International Publication Number WO 95/20865) involves border base stations that are connection to two RNCs. When the mobile station becomes connected to at least one border base station, but no base station owned by the source RNC, the inter-RNC handover can occur.

There are inter-exchange handover protocols specified such as GSM Recommendation 09.02 "Mobile Application Part (MAP)" for GSM; IS41 for AMPS/D-AMPS/IS-95; or INHAP for PDC. In the IS-41 specification, for example, inter-exchange transfer is specified for call related signal quality measurements on specified channels. The signal quality measurements is done by a base station controlled from a second exchange, and transferred to a first exchange where the call for a mobile station is controlled. The measurements are carried out only for a specific mobile station and are used for obtaining a list of possible handover cell candidates for the specific mobile station from the second exchange. In this regard, see also International Application Number PCT/US94/12419 (International Publication Number WO 95/15665).

In some telecommunications networks, the RAN also monitors the current usage of resources. In conjunction with such monitoring, the RAN can reconfigure connections (e.g., change the allowed usage of resources by a connection, queue the connection, terminate the connection, or move the connection).

Soft handovers, Inter-RNC handovers, and connection configuring pertain to existing connections (e.g., existing calls). A more fundamental issue occurs when a call is to be setup to or from a mobile station. That fundamental issue is whether the radio access network (RAN) should admit or reject the call. A reason for rejection of a call may be that there is a lack of system resources to serve the call. The function within the RAN that makes this admit/reject decision is generally called "admission control." Admission control is particularly important in generations of telecommunications systems which offer a variety of bearer services.

Connection reconfiguring, therefore, does not address the fundamental issue of admission control. Rather, connection reconfiguring subsequently adjusts for "bad" admission control decisions or for other factors that could not earlier be predicted (e.g., such as misbehavior by a mobile station, failures in the network, or other disturbances). This connection reconfiguring is also termed "congestion control."

A typical method for call admission and congestion control is based on a total power (e.g., interference) determination performed by a base station to which a call is about to be set up. The total power determination involves summing the power received from all mobile stations with which the base station is currently in communication. If the received power does not exceed a threshold, a call is accepted. Otherwise, the call is rejected.

The prior art admission control procedure does not take into consideration measurements of received power in cells located across an exchange border. Yet, in some systems such as CDMA, everyone essentially disturbs everyone else. For example, in CDMA where frequencies are reused in every cell, a call occasions not only radio interference in the cell in which the mobile station is currently located, but in neighboring cells as well.

What is needed therefore, and an object of the invention, is a call admission technique which more comprehensively determines radio interference.

BRIEF SUMMARY OF THE INVENTION

Telecommunications network decision making (such as call admission and call congestion control) utilizes as input, not only information in the cell where the call is setup, but also cell condition information from cells which neighbor the cell where the call is setup. The cell condition information from neighboring cells is obtained even in situations in which the neighboring cell is controlled by another exchange, e.g., another radio network controller (RNC).

The cell condition information is a value or other indication regarding multi-connection phenomena occurring in the cell, e.g., throughout the cell, and is not specific to any one connection. In an illustrated embodiment, the cell condition information utilized by the decision making includes measured data, one example of which is radio interference information. In this example, the decision making process considers not only radio interference information in the cell where the call is setup, but also radio interference information in cells which neighbor the cell where the call is setup (even in situations in which the neighboring cell is controlled by another exchange).

The cell condition information utilized in the network decision making is transmitted between exchanges (e.g., between radio network controllers [RNCs]) using common channel signaling.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention provides efficient telecommunications network decision making which utilizes as input, not only information in the cell where the call is setup, but also cell condition information from cells which neighbor the cell where the call is setup. The cell condition information from neighboring cells is obtained even in situations in which the neighboring cell is controlled by another exchange, e.g., another radio network controller (RNC).

The cell condition information is a value or other indication regarding multi-connection phenomena occurring in the cell, e.g., throughout the cell, and is not specific to any one connection. Therefore, cell condition information does not include channel or connection-specific information utilized, e.g., for soft handover for requesting a radio resource for a specific connection.

An example of network decision making encompassed by the present invention include call admission and congestion control. In an illustrated embodiment, the cell condition information utilized by the decision making includes measured data, one example of which is radio interference information. In this example, the decision making process considers not only radio interference information in the cell where the call is setup, but also radio interference information in cells which neighbor the cell where the call is setup (even in situations in which the neighboring cell is controlled by another exchange). The decision making and techniques of the present example are discussed in the context of an example topography shown in FIG. 2.

Figure 1:
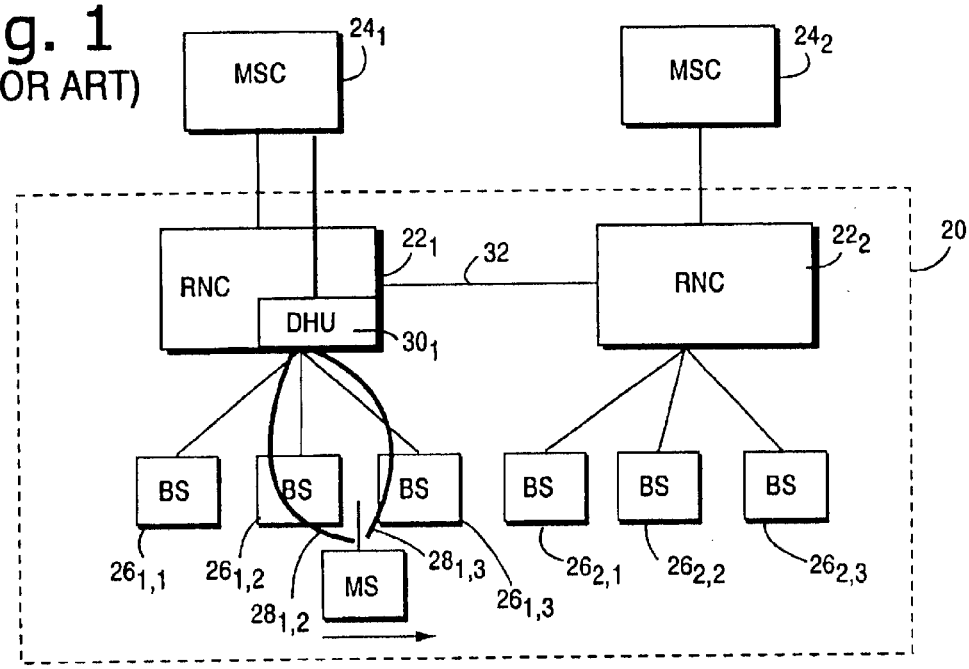
FIG. 1 and FIG. 1A are diagrammatic views showing prior art management of a mobile connection relative to a Source radio network controller and a Target radio network controller.
Figure 1A:
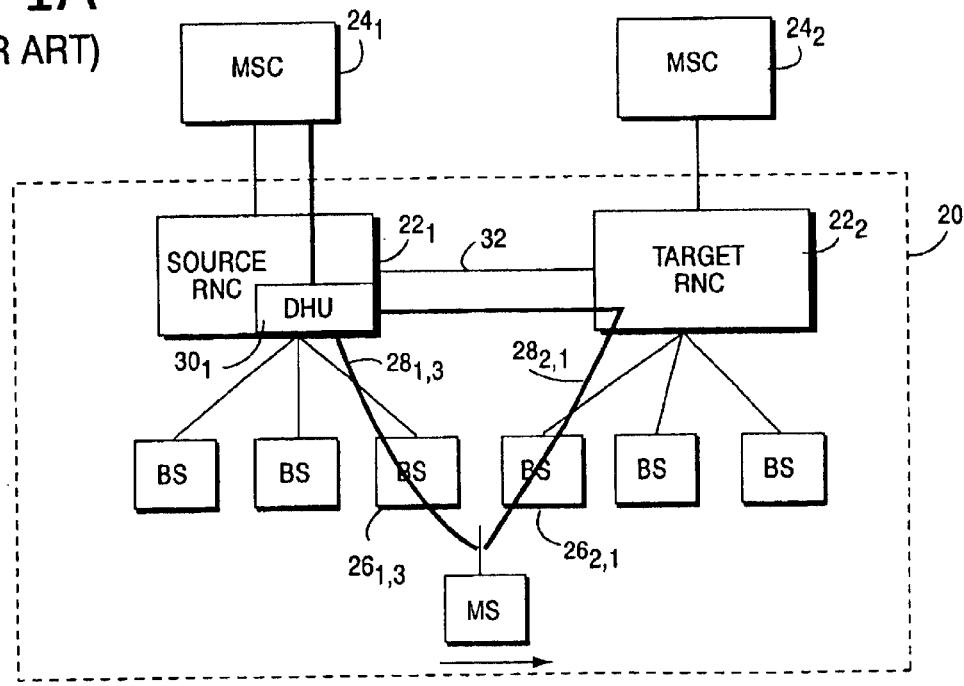
Figure 2:
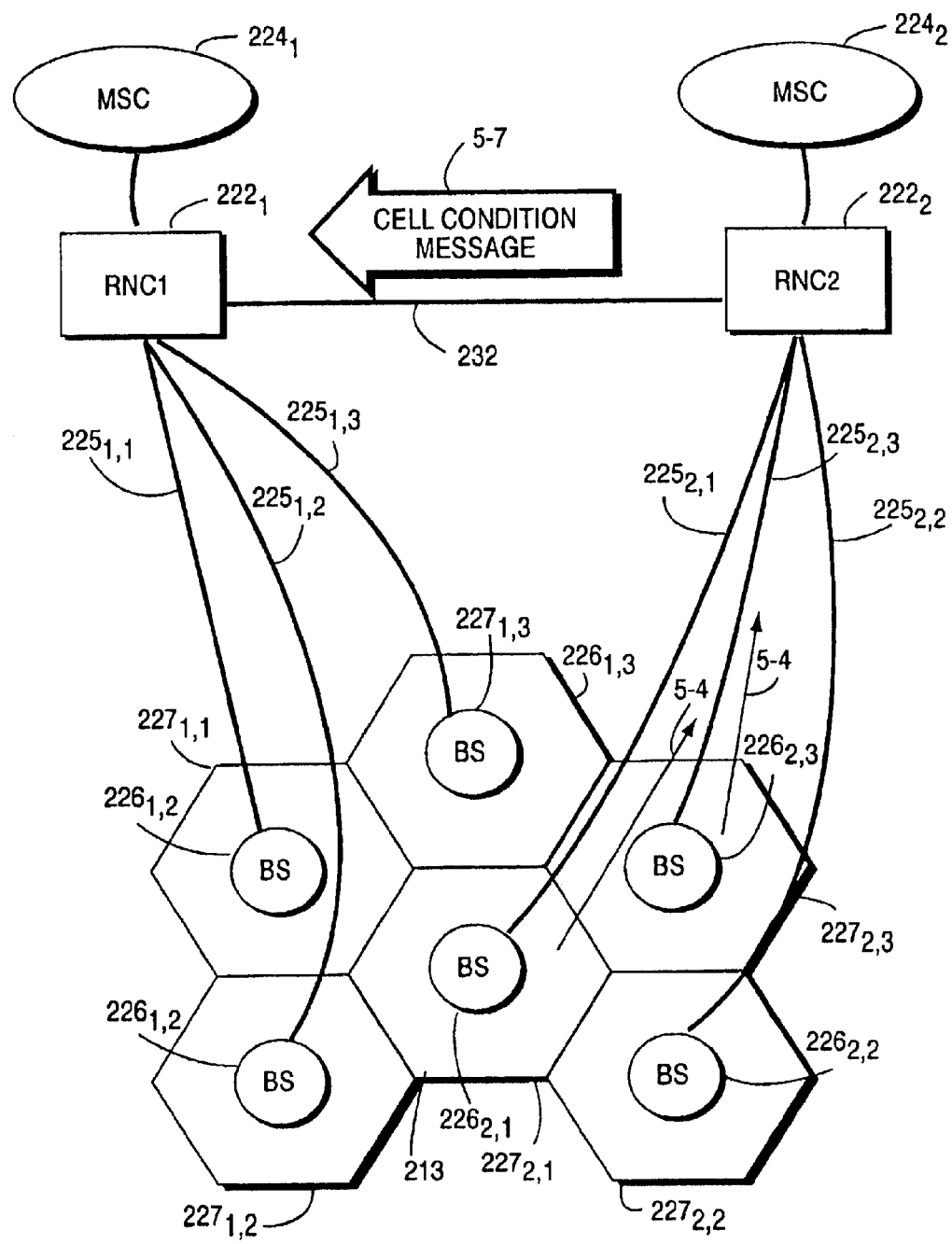
FIG. 2 is a diagrammatic views showing an example radio access network for illustrating a call admission technique of the present invention.

FIG. 2 shows a radio access network (RAN) 220 which comprises exchanges or radio network controllers (RNC) $222_1$ and $222_2$ respectively connected to mobile switching centers (MSC) $224_1$ and $224_2$. Radio network controller (RNC) $222_1$ is connected via links $225_{1,1}$, $225_{1,2}$, and $225_{1,3}$ to base stations (BS) $226_{1,1}$, $226_{1,2}$, and $226_{1,3}$. Base stations (BS) $226_{1,1}$, $226_{1,2}$, and $226_{1,3}$ serve respective cells $227_{1,1}$, $227_{1,2}$, and $227_{1,3}$. Radio network controller (RNC) $222_2$ is likewise connected via links $225_{2,1}$, $225_{2,2}$, and $225_{2,3}$ to base stations (BS) $226_{2,1}$, $226_{2,2}$, and $226_{2,3}$. Base stations (BS) $226_{2,1}$, $226_{2,2}$, and $226_{2,3}$ serve respective cells $127_{2,1}$, $127_{2,2}$, and $127_{2,3}$. An exchange border 231 is shown as separating a first group of cells served by base stations controlled by radio network controller (RNC) $222_1$ (i.e., cells $227_{1,1}$, $227_{1,2}$, and $227_{1,3}$) and a second group of cells served by base stations controlled by radio network controller (RNC) $222_2$ (i.e., cells $227_{2,1}$, $227_{2,2}$, and $227_{2,3}$). The radio network controllers (RNC) $122_1$ and $122_2$ are connected by an inter-RNC transport link 232.

The radio network controller (RNC) $222_1$ and radio network controller (RNC) $222_2$ can be any type of exchange which hosts radio network control functionality for a number of base stations. As such, radio network controller (RNC) $222_1$ and radio network controller (RNC) $222_2$ can be either distantly located or collocated, and can even be collocated with the mobile switching centers (MSC) 224.

It should also be understood that radio network controller (RNC) $222_1$ and radio network controller (RNC) $222_2$ can be, and likely are, connected to other radio network controllers (RNCs). Accordingly, additional inter-RNC transport links 232 are shown. The inter-RNC transport links 232 can be either direct links or links going via an other exchange, such as an MSC which has the connection with the fixed telephone network.

Figure 3:
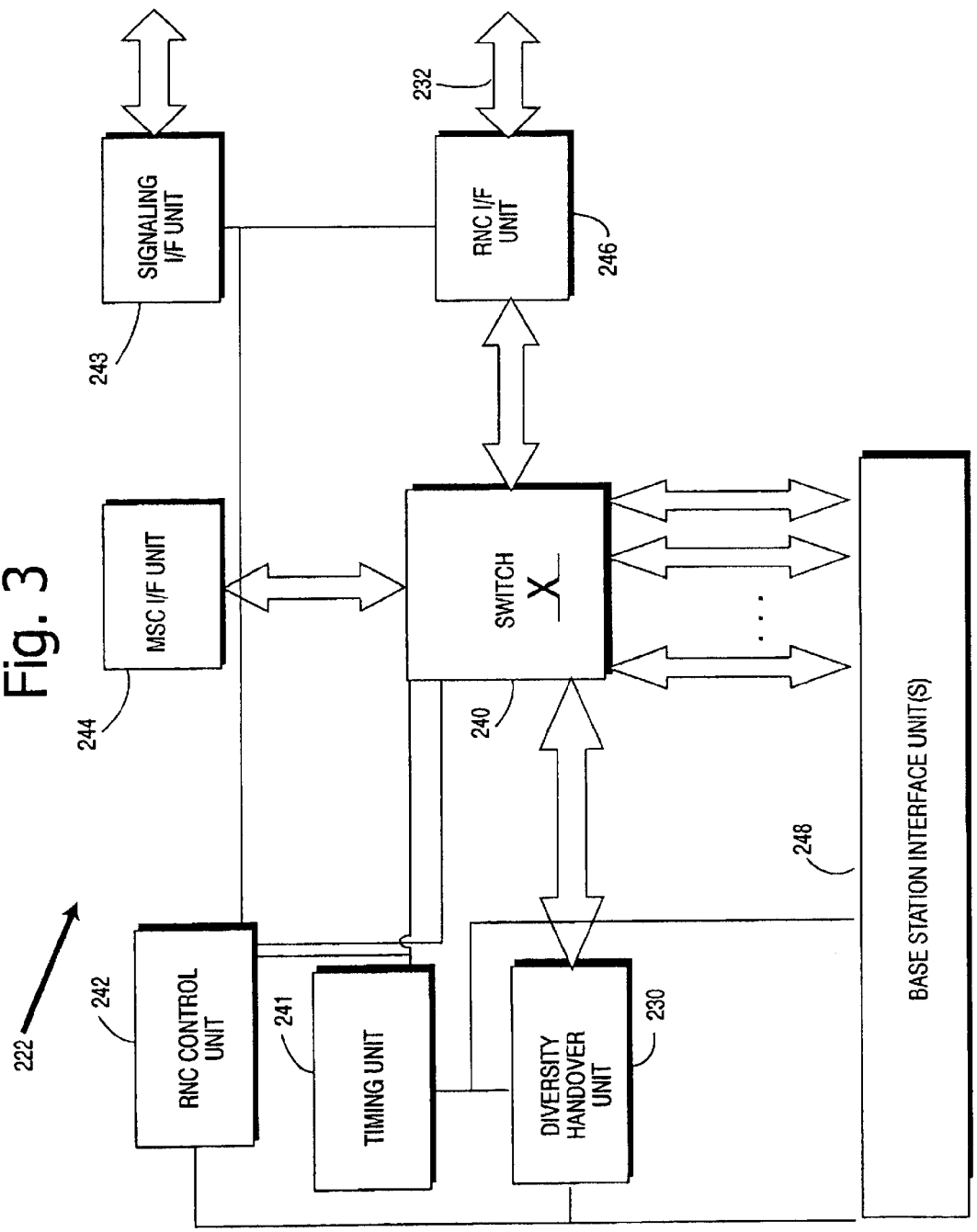
FIG. 3 is a schematic view of an example radio network controller (RNC) which operates in accordance with a mode of the present invention.

An example radio network controller (RNC) 222 is shown in FIG. 3 as comprising a switch 240. Switch 240, which is controlled by RNC control unit 242, has a plurality of ports, some of which are connected to diversity handover unit (DHU) 230 and others of which are connected to various interfaces. Diversity handover unit (DHU) 230 is connected to a timing unit 241. The RNC control unit 242 is connected to each element of RNC 222. RNC 222 is connected to a signaling network via a signaling interface 243. Signaling interface 243 is connected to RNC control unit 242. The interfaces connected to ports of switch 240 include MSC interface unit 244; RNC interface unit 246; and base station interface units 248. MSC interface unit 244 is connected to the appropriate mobile switching center 224. RNC interface unit 246 is connected to inter-RNC transport link 232. Base station interface units 248 are connected to the set of base stations (BS) served by the RNC 222.

Figure 4:
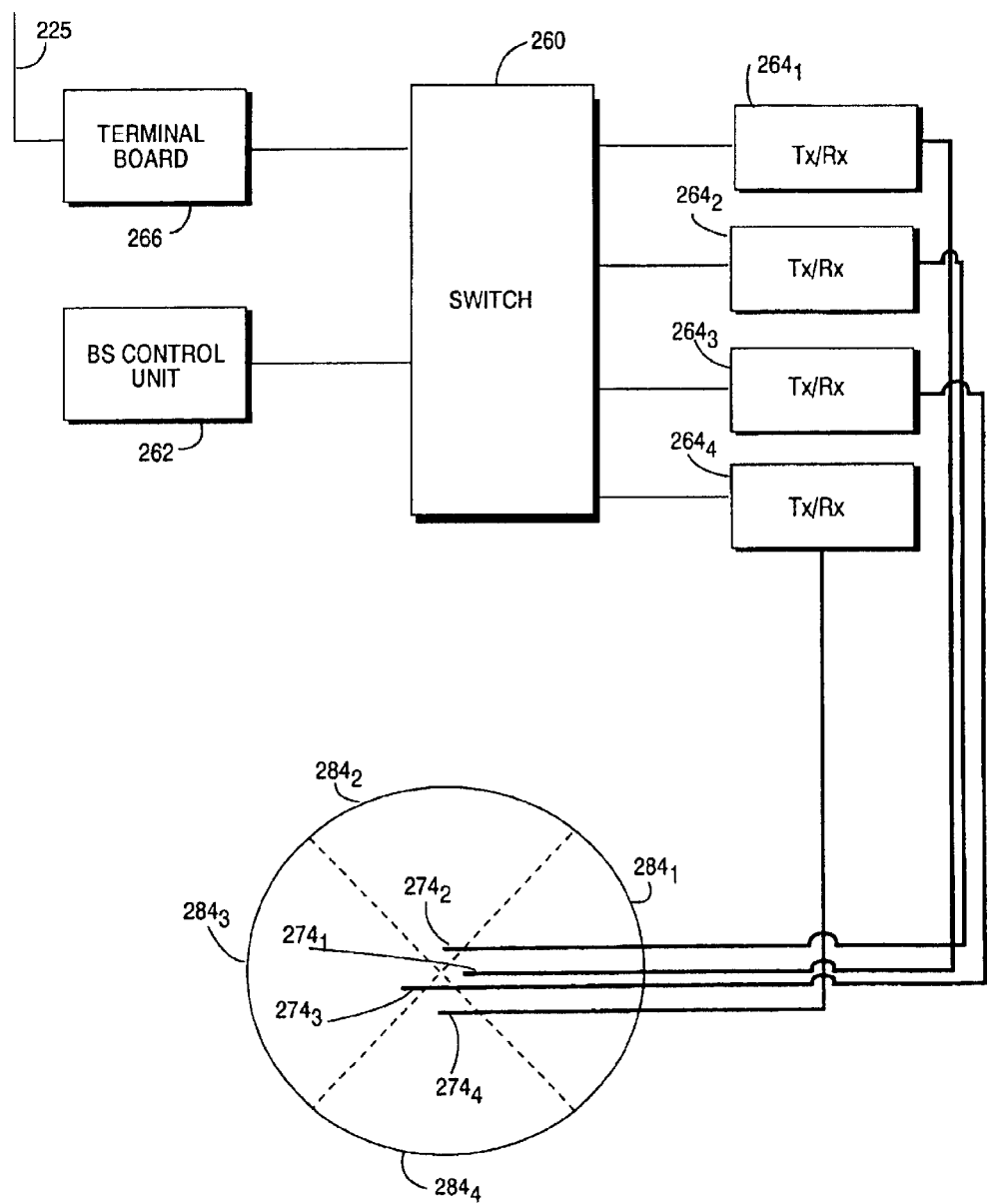
FIG. 4 is a schematic view of an example base station (BS) which operates in accordance with a mode of the present invention.

An example base station (BS) 226 is shown in FIG. 4 as comprising a switch 260. Switch 260, which is controlled by base station control unit 262, has a plurality of ports. At least one, and typically several, of the ports of switch 260 are connected to respective transceiver (Tx/Rx) boards 264. Transceiver (Tx/Rx) boards 264 are connected to antennae which are located in the cell served by the base station (BS) 226. Control unit 262 is also connected to ports of switch 260, as is an terminal board 266. It is through terminal board 266 that base station (BS) 226 communications with its radio network controller (RNC) 222, with link 225 being connected between an appropriate base station interface unit 248 of the radio network controller (RNC) 222 (see FIG. 3) and terminal board 266.

In the example of FIG. 4, four transceiver boards (Tx/Rx) $264_1$ through $264_4$ are shown, each being associated with a respective antenna $274_1$ through $274_4$, respectively. Antennae antenna $274_1$ through $274_4$, serve sectors $284_1$ through $284_4$, respectively, of a cell 290. It should be understood that the number of sectors and number of transceiver boards (Tx/Rx) 264 is not critical to the present invention, nor even is sectorization of a cell necessary. Typically a base station has three to six sectors and one to three frequencies (depending on the call capacity to be served by the base station), but the invention is not limited to cell sectorization or use of multiple frequencies.

The particular example embodiments of radio network controller (RNC) 222 shown in FIG. 3 and base station (BS) 224 shown in FIG. 4 happen to be ATM-based nodes. In this regard, both switch 240 of radio network controller (RNC) 222 and switch 260 of base station (BS) 224 are, in the illustrated example embodiments, ATM switches through which ATM cells are directed. It should be understood that the present invention is not limited to the particular architectures of the example radio network controller (RNC) 222 and base station (BS) 224 shown, nor the use of ATM switches, but that other architectures and data transfer techniques can be employed within the scope and spirit of the present invention.

Figure 5:
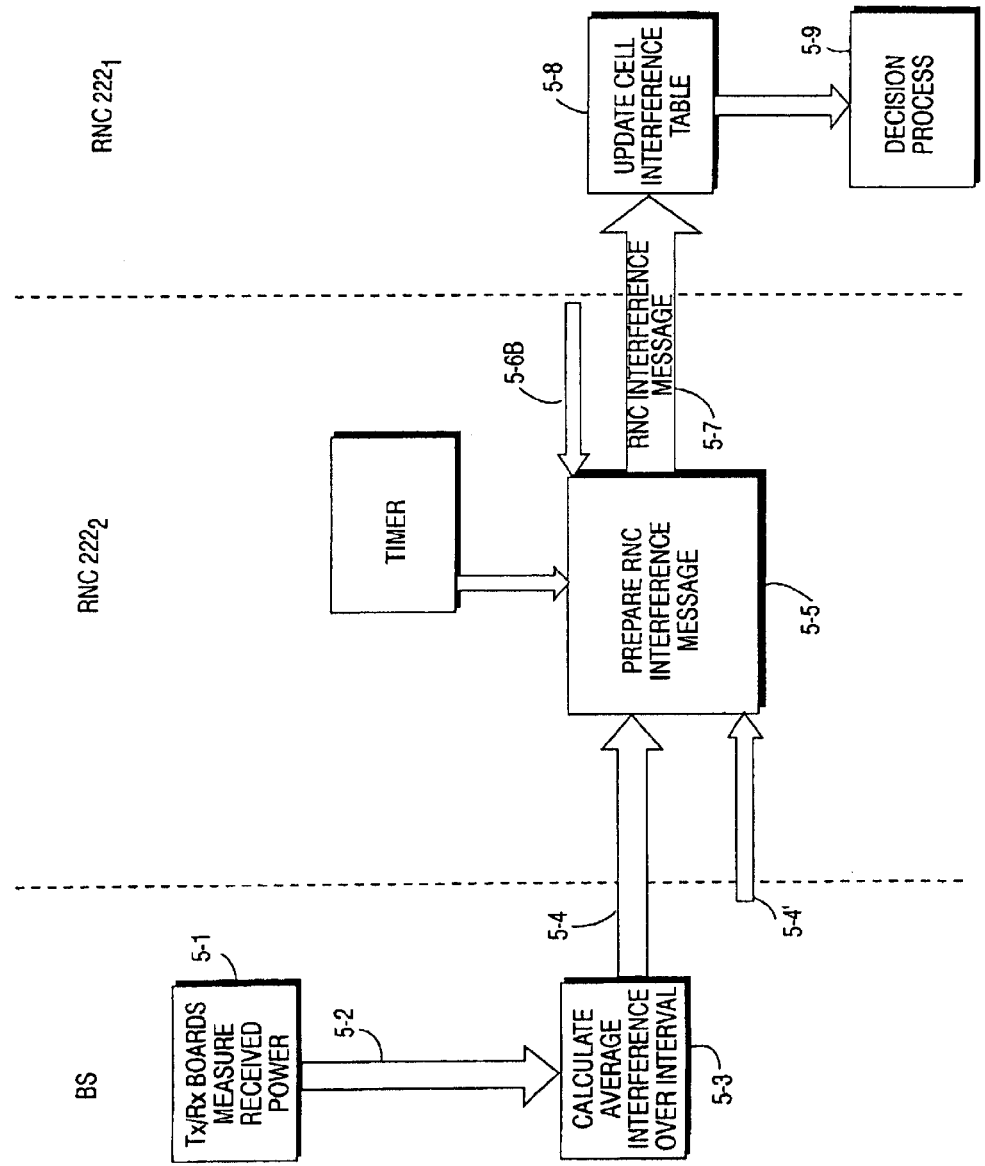
FIG. 5 is a flowchart showing basic steps included in preparation, transmission, and utilization of an Inter-RNC measurement message according to an embodiment of the invention.

The comprehensive call admission technique of the present invention, which considers radio interference in cells neighboring the cell in which the call is setup, has basic steps which are depicted in FIG. 5. The flowchart of FIG. 5 concerns an example scenario described in the context of the network topology of FIG. 2.

Step 5-1 shows the transceiver boards (Tx/Rx) 264 of base station (BS) $226_{2,1}$ measuring (with respect to each frequency) the total power received (over all connections) from the various mobile stations with which the transceiver boards (Tx/Rx) 264 are in radio communication. For each frequency, each transceiver board (Tx/Rx) 264 periodically sends a power received message to its BS control unit 262, as indicated by arrow 5-2 in FIG. 5. The power received message depicted by arrow 5-2 includes an identification of the radio frequency reported and an indication of the measure of the received power for that radio frequency. As step 5-3, BS control unit 262 performs, at regular intervals, a calculation of an average value of the received power (e.g., interference) over the interval. Received interference is the same as received power, e.g., the power received at base station (BS) $226_{2,1}$ from all mobile stations with transmissions sufficiently strong to be detected by base station (BS) $226_{2,1}$.

Thus, the average total received power throughout the cell as calculated by BS control unit 262. Average total received power is but one example of cell condition information. Other examples of cell condition information can include cell status (up/down) and transmitted power from the base station per frequency.

At the end of each interval, the measurements of average interference values obtained at step 5-3 are sent from BS control unit 262 of base station (BS) $226_{2,1}$ to radio network controller (RNC) $222_2$ over link $225_{2,1}$. Arrow 5-4 in FIG. 2 and in FIG. 5 show the transmission of an BS AVERAGE INTERFERENCE MESSAGE sent from base station (BS) $226_{2,1}$ to radio network controller (RNC) $222_2$. The BS AVERAGE INTERFERENCE MESSAGE contains, e.g., a value of the total received power for each sector and frequency. The BS AVERAGE INTERFERENCE MESSAGE is routed through radio network controller (RNC) $222_2$ to its RNC control unit 242.

RNC control unit 242 of radio network controller (RNC) $222_2$ receives BS AVERAGE INTERFERENCE MESSAGES from several, if not all, of the base stations (BS) controlled by radio network controller (RNC) $222_2$. As discussed above, base station (BS) $226_{2,1}$ sent the BS AVERAGE INTERFERENCE MESSAGE depicted by step 5-4. In the context of FIG. 2, for example, radio network controller (RNC) $222_2$ may receive another BS AVERAGE INTERFERENCE MESSAGE, depicted by step 5-4', from base station (BS) $226_{2,3}$. The BS AVERAGE INTERFERENCE MESSAGE (step 5-4') from base station (BS) $226_{2,3}$, would, of course, contain comparable types of measurements conducted by base station (BS) $226_{2,3}$ with respect to the connections with which it is engaged.

As it receives the BS AVERAGE INTERFERENCE MESSAGES (e.g., step 5-4 and step 5-4') from potential plural base stations, RNC control unit 242 of radio network controller (RNC) $222_2$ prepares a unique RNC INTERFERENCE MESSAGE for transmission to each of the other RNCs having cells adjacent to cells controlled by radio network controller (RNC) $222_2$. For example, radio network controller (RNC) $222_2$ knows that its cells $227_{2,1}$ and $227_{2,3}$ lie along border 231 with cells belonging to radio network controller (RNC) $222_1$. Therefore, as shown by step 5-5 in FIG. 5, radio network controller (RNC) $222_2$ prepares an RNC INTERFERENCE MESSAGE for transmission to radio network controller (RNC) $222_1$, which RNC INTERFERENCE MESSAGE includes interference values from base station $226_{2,1}$ (located in cell $227_{2,1}$) and base station $226_{2,3}$ (located in cell $227_{2,3}$). A comparable RNC INTERFERENCE MESSAGE is prepared by radio network controller (RNC) $222_2$ for transmission to another radio network controller (RNC) 222, such comparable message having measurements from base stations serving cells lying along a border with cells served by such other radio network controller (RNC) 222.

Figure 6:
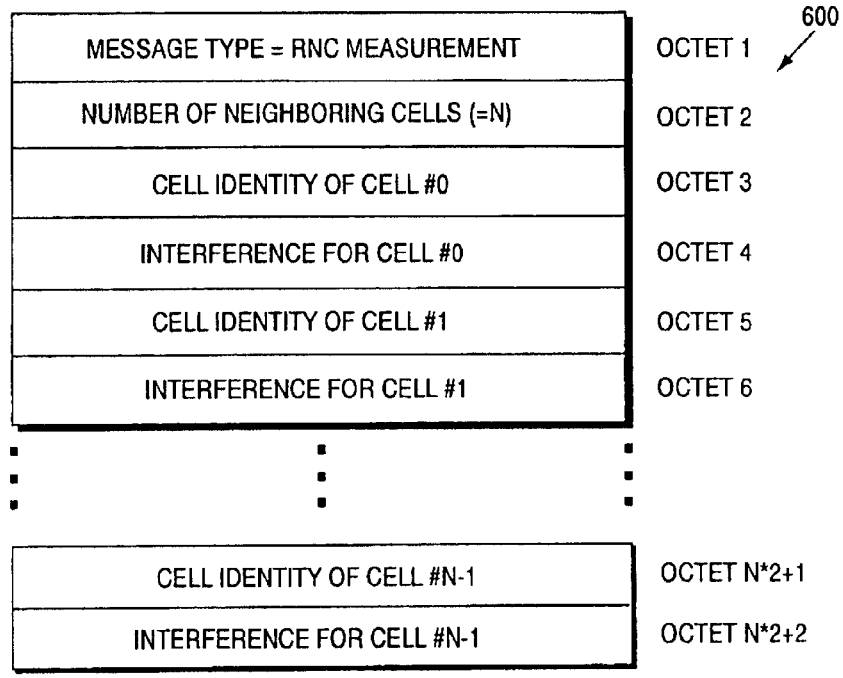
FIG. 6 is a diagrammatic view of an example format for a RNC INTERFERENCE MESSAGE according to an embodiment of the present invention.

An example format for the RNC INTERFERENCE MESSAGE can be as shown in message 600 of FIG. 6. The RNC INTERFERENCE MESSAGE 600 has N*2+2 octets of data. The first octet bears an indication of message type, i.e., that this message is an RNC INTERFERENCE MESSAGE rather than another type of message transmitted on Inter-RNC link 232. The second octet of RNC INTERFERENCE MESSAGE 600 contains a value N indicative of the number of neighboring cells in the sending RNC (e.g., radio network controller (RNC) $222_2$) for which interference values are being reported in this RNC INTERFERENCE MESSAGE 600. It is this value N that determines the length of the RNC INTERFERENCE MESSAGE 600 in accordance with the foregoing relation. The remaining octets in RNC INTERFERENCE MESSAGE 600 are paired, with a first octet of each pair providing an identity of a cell and the second octet of each pair providing an interference value for the respective cell. In the scenario depicted in FIG. 2 and FIG. 5 (wherein a call setup request is made from cell $227_{1,3}$), for example, the third octet of RNC INTERFERENCE MESSAGE 600 would have an identifier for cell $227_{2,1}$; the fourth octet would have an interference value for cell $227_{2,1}$; the fifth octet would have an identifier for cell $227_{2,3}$; the sixth octet would have an interference value for cell $227_{2,3}$. The RNC INTERFERENCE MESSAGE from a reporting RNC has a pairing of octets for each of N cells owned by the reporting RNC and which are adjacent to the border 231 between the areas controlled by the respective RNCs.

Transmission of the RNC INTERFERENCE MESSAGE can be triggered by any of several techniques. For example, as indicated by arrow 5-6a of FIG. 5, transmission of the RNC INTERFERENCE MESSAGE can be periodically triggered by a timer maintained by radio network controller (RNC) $222_2$. Alternatively, radio network controller (RNC) $222_2$ can transmit the RNC INTERFERENCE MESSAGE in response to a request (indicated by arrow 5-6b) from radio network controller (RNC) $222_1$. Once triggered, transmission of the RNC INTERFERENCE MESSAGE from radio network controller (RNC) $222_2$ to radio network controller (RNC) $222_1$ occurs as shown by arrow 5-7 in FIG. 5.

In the illustrative architecture of a radio network controller (RNC) 222 as herein described, the RNC INTERFERENCE MESSAGE from RNC control unit 242 of radio network controller (RNC) $222_2$ is routed through switch 240 to RNC interface 246 of radio network controller (RNC) $222_2$ for application to inter-RNC transport link 232. At radio network controller (RNC) $222_1$ the RNC INTERFERENCE MESSAGE is received at its RNC interface 246 and routed through its switch 240 to its RNC control unit 242.

Figure 9:
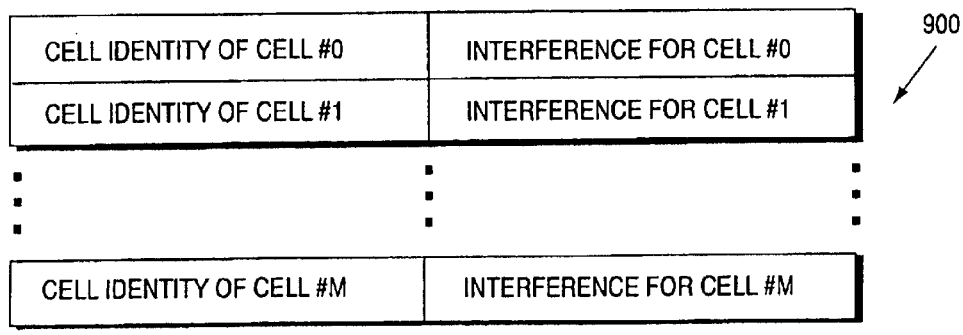
FIG. 9 is a diagrammatic view of an example format for a cell interference table according to an embodiment of the present invention.

As shown by step 5-8 of FIG. 5, RNC control unit 242 of radio network controller (RNC) $222_1$ uses the measurements received in the RNC INTERFERENCE MESSAGE obtained from radio network controller (RNC) $222_2$ to update a cell interference table 900 (see FIG. 9) which it maintains. The cell interference table 900 has M number of records, each record having a pairs of entries. A first entry of each record includes information for identifying a cell; the second entry of each record stores an interference value for the associated cell identified in the first entry of the same record. The cell interference table 900 has records for (1) each cell having base stations controlled by the RNC, as well as for (2) cells which neighbor the cells having base stations controlled by the RNC. Thus, in the example of FIG. 2, the cell interference table 900 stored at radio network controller (RNC) $222_1$ has records for each of cells $227_{1,1}$ through $227_{1,3}$ as well as for cells $227_{2,1}$ and $227_{2,3}$.

Thus, at step 5-8, when a RNC INTERFERENCE MESSAGE is received from another RNC as in step 5-7, the RNC which receives the RNC INTERFERENCE MESSAGE uses the cell identifiers and interference values stored in the received RNC INTERFERENCE MESSAGE to update the cell interference table 900 maintained at the receiving RNC.

From time to time the RNC control unit 242 of radio network controller (RNC) $222_1$ will have to perform a decision process (depicted by step 5-9). The decision process of step 5-9 can be, for example, a call admission decision or a call congestion decision.

Figure 7:
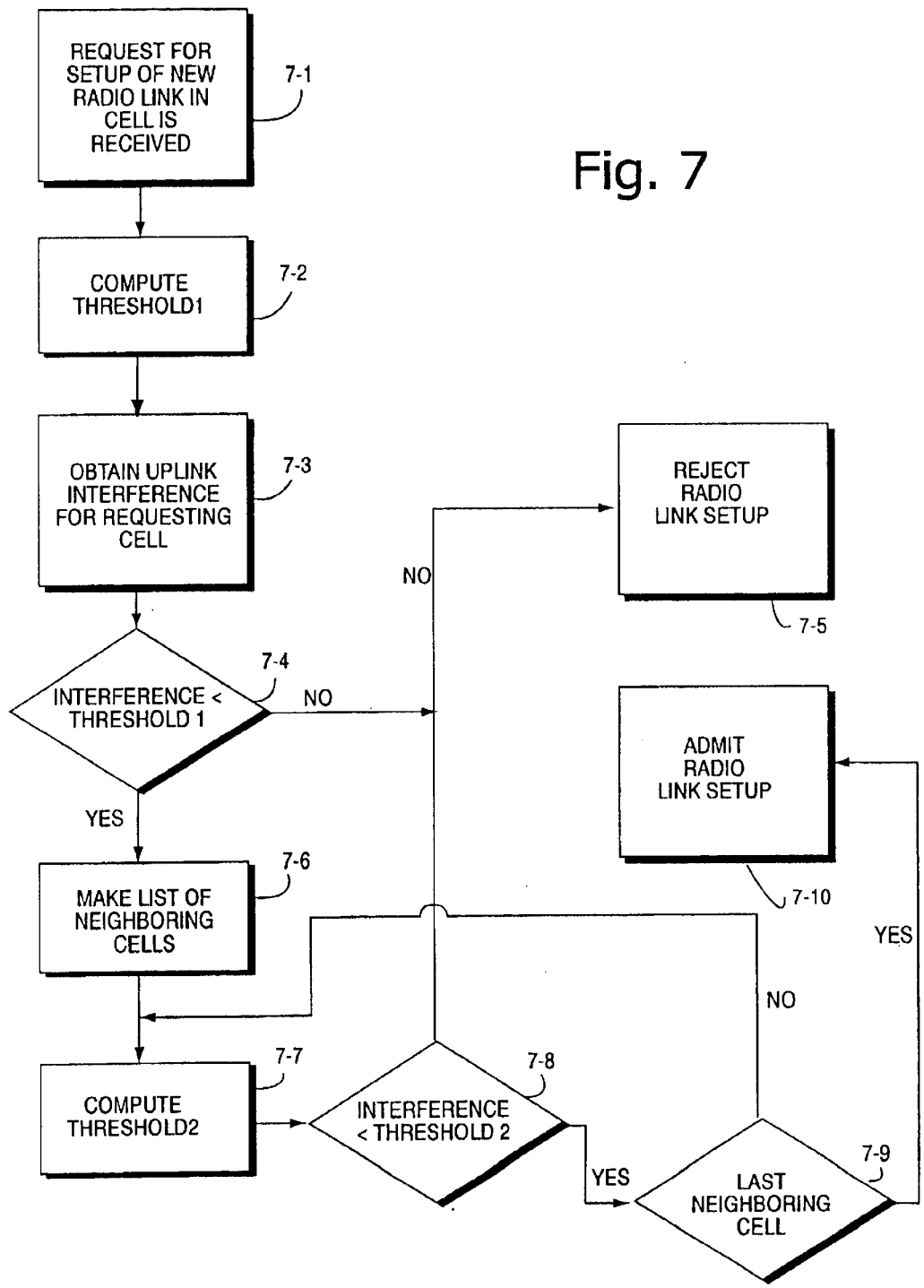
FIG. 7 is a flowchart showing basic steps included in one mode of a call admission technique of the present invention.

Basic steps involved in a call admission decision are shown in FIG. 7. It is again assumed, for sake of example, that RNC control unit 242 of radio network controller (RNC) $222_1$ is involved in a call admission decision respecting a call setup requested by a mobile station in cell $227_{1,3}$, in which case interference measurements from neighboring cells $227_{2,1}$ and $227_{2,3}$ would be pertinent.

Step 7-1 of the call admission technique of FIG. 7 indicates that a connection setup request has been received by radio network controller (RNC) $222_1$. In the example under discussion, the connection setup request has been received from a mobile station now situated in cell $227_{1,3}$.

At step 7-2 the RNC controlling the call, i.e., radio network controller (RNC) $222_1$ in the scenario of FIG. 2, computes a threshold ("THRESHOLD1"). In the illustrated embodiment, THRESHOLD1 is computed on the basis of the maximum tolerable uplink interference for the cell, minus the predicted uplink power caused by the particular connection (based on e.g., its bitrate and bit error rate).

At step 7-3, the RNC control unit 242 of radio network controller (RNC) $222_1$ consults the cell interference table 900 which it maintains to determine the uplink interference for the requesting cell (e.g., cell $227_{1,3}$ in the present example). Then, at step 7-4, RNC control unit 242 of radio network controller (RNC) $222_1$ determines whether the interference in the requesting cell is less than THRESHOLD1. If the interference in the requesting cell equals or exceeds THRESHOLD1, the call setup request is rejected as indicated by step 7-5. Thus, the call setup request is denied if the cell in which the call would originate already has excessive interference.

Even though interference may not be a problem in the cell in which the call would originate, the RNC control unit 242 of radio network controller (RNC) $222_1$ makes a further interference determination regarding interference in neighboring cells (e.g., cells neighboring the cell in which the call would originate). In this regard, at step 7-6 the RNC control unit 242 of radio network controller (RNC) $222_1$ makes a list of cells which border or neighbor the cell in which the call would originate. In the context of the present example illustrated with reference to FIG. 2, at step 7-6 a list including cells $227_{1,1}$, $227_{2,1}$, and $227_{2,3}$ is complied, since all these cells neighbor cell $227_{1,3}$. Such a list is easily composed in view of knowledge by RNC control unit 242 of radio network controller (RNC) $222_1$ of the network topography.

The RNC control unit 242 of radio network controller (RNC) $222_1$ performs a loop comprising steps 7-7 through 7-9 for each of the cells listed at step 7-6. The loop of FIG. 7 is conducted separately for each neighboring cell. At step 7-7, the RNC control unit 242 of radio network controller (RNC) $222_1$ computes another threshold value, particularly THRESHOLD2 for the neighboring cell. In the illustrated embodiment, THRESHOLD2 is computed on the basis of the maximum tolerable uplink interference for the neighboring cell, minus the predicted uplink power in the neighboring cell caused by the particular connection (based on e.g., its bitrate, bit error rate, and distance to the neighboring cell). At step 7-8 a check is performed to determine whether the interference for the respective cell (obtained from the second field of the record in cell interference table 900 for the respective cell) is less than THRESHOLD2. If the check of step 7-8 is affirmative, execution of the loop continues until it is determined at step 7-9 that the last neighboring cell (e.g., the last cell on the list developed at step 7-6) has been checked. When the last cell on the list has been checked, at step 7-10 the RNC control unit 242 of radio network controller (RNC) $222_1$ proceeds to admit the call, i.e., to permit setup of a radio connection. If, on the other hand, it is determined that the check at step 7-8 is negative for any neighboring cell, at step 7-5 the connection setup request is rejected.

Thus, in the above scenario, in the loop including step 7-8, step 7-8 would be performed for each neighboring cell prior to a connection being successfully setup. In the example of FIG. 2 (where the setup request is from cell $227_{1,3}$), therefore, step 7-8 would be performed for each of cell $227_{1,1}$, $227_{2,1}$, $227_{2,3}$.

Another example of the type of decision performed by the decision process of step 5-9 is that of a congestion control decision. Congestion control attempts to lower the interference level in the system, hence forcing the system back to a stable state. In general, this can be done by lowering the bit rates for the mobile stations or putting the connections to mobile stations in a queue or the like and permitting them to reenter the system only when the system has a lower load. Conversely, the bit rates can also be increased if the current system load is low.

In accordance with the present invention, a first RNC (such as radio network controllers (RNC) $222_2$) can inform a second RNC (e.g., radio network controller (RNC) $222_1$) of congestion in a cell managed by the first RNC. That is, the interference measurement values obtained by a radio network controller (RNC) 222 in a RNC INTERFERENCE MESSAGE from another radio network controller (RNC) 222 can also be used to trigger congestion control functions. The congestion control function, also performed by RNC control unit 242, justifies continuation of on-going calls, or modifies on-going calls if necessary, to result in less interference. Actions taken by RNC control unit 242 can be, e.g., decreasing output power from a mobile station (which also decreases connection quality); decreasing the bit rate on variable bit rate types of connections with tolerance delay; and even disconnection of calls.

Figure 8:
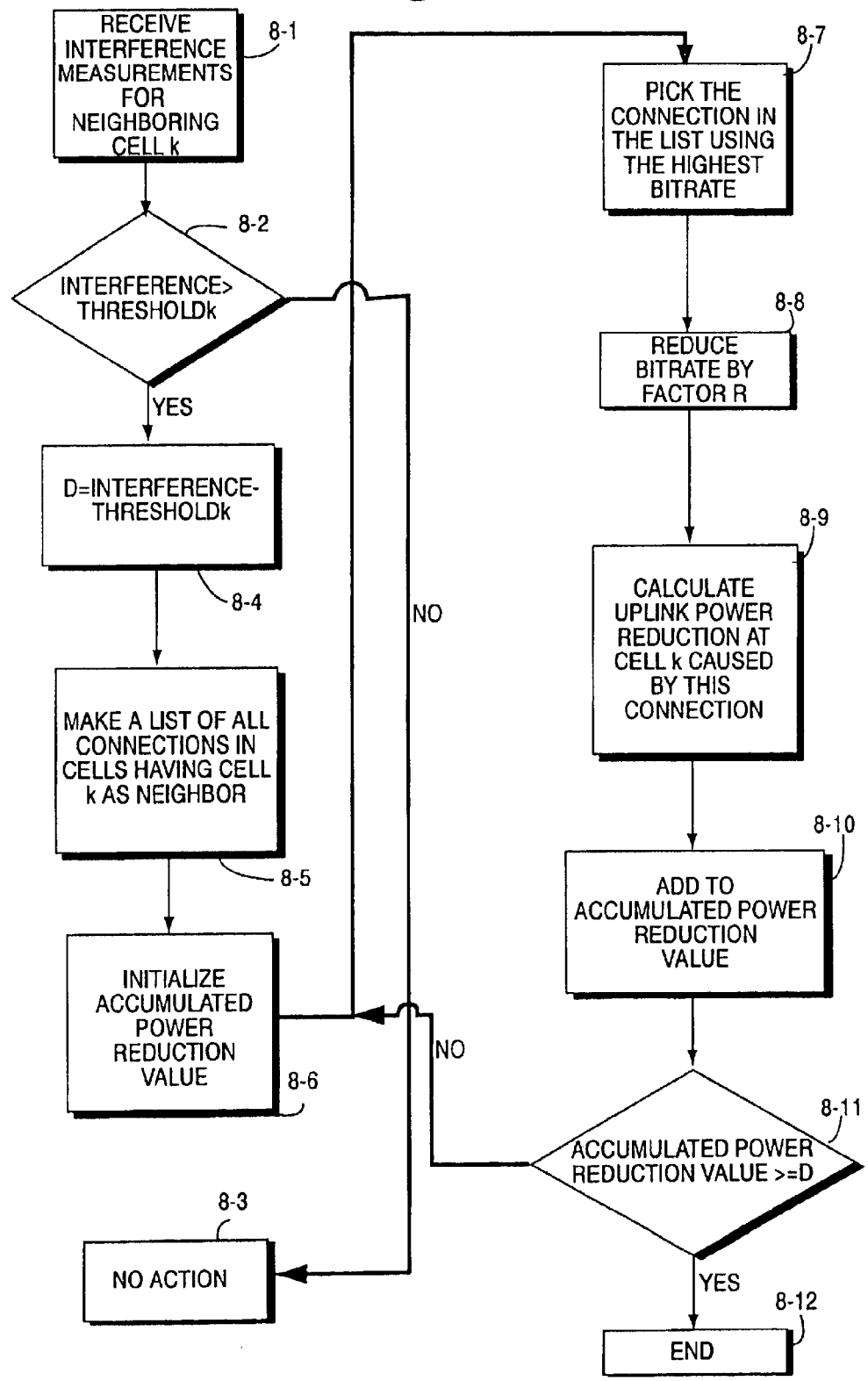
FIG. 8 is a flowchart showing basic steps included in one mode of a congestion control technique of the present invention.

Basic steps involved in an example congestion control technique is shown in FIG. 8. Step 8-1 shows that inference measurements for a neighboring cell k is received at RNC control unit 242 of radio network controller (RNC) 222₁. In the illustration of FIG. 8, the "neighboring cell k" can be, for example, cell 227₂,₃ of FIG. 2. The inference measurements for a neighboring cell k are included in an RNC INTERFERENCE MESSAGE, such as the cell condition message shown in FIG. 2. The generation and transmission of the inference measurements for a neighboring cell k is understood with reference to the foregoing discussion concerning, for example, FIG. 2 and FIG. 5.

At step 8-2 RNC control unit 242 of radio network controller (RNC) 222₁ compares the measured interference value for cell k (received at step 8-1) with a value THRESHOLDk. The value TRESHOLDk is based on the maximum acceptable uplink interference for cell k, until actions have to be taken in neighboring cells. At this point, it is noted that an internal congestion control in neighboring cell k will have previously attempted to reduce the uplink power caused by connections within that cell. The value of THRESHOLDk shall likely be quite high (or at least the interference shall be above THRESHOLDk for a long time) before actions are taken.

If the measured interference value for cell k as determined at step 8-2 does not exceed the value of THRESHOLDk, no action need be taken (as reflected by step 8-3). If the contrary is true (i.e., if the measured interference value for cell k as determined at step 8-2 does exceed the value of THRESHOLDk), the remaining steps of FIG. 8 are performed.

At step 8-4 RNC control unit 242 of radio network controller (RNC) 222₁ determines a difference D between the measured interference value for cell k (as received at step 8-1) and the value of THRESHOLDk. In other words, D=INTERFERENCE−THRESHOLDk. Then, at step 85 the RNC control unit 242 of radio network controller (RNC) 222₁ develops a list of all connections (controlled by source radio network controller (RNC) 222₁) in cells having cell k as a neighbor. In the illustration of FIG. 2, assuming cell k to be cell 227₂,₃, the list would include connections in cell 227₁,₃. After developing the list of step 8-5, an ACCUMULATED POWER REDUCTION VALUE (APRV) is initialized at step 8-6.

After developing the list of step 8-5 and the initialization of step 8-6, the RNC control unit 242 of radio network controller (RNC) 222₁ performs a loop comprising step 8-7 through step 8-10. At step 8-7, RNC control unit 242 of radio network controller (RNC) 222₁ picks (from the list of step 8-5) the connection having the highest bitrate. Then, at step 8-8 the RNC control unit 242 of radio network controller (RNC) 222₁ reduces the bitrate for the connection picked at step 8-7. The bitrate reduction is by a factor R (e.g.,R=2).

At step 8-9 RNC control unit 242 of radio network controller (RNC) 222₁ calculates the uplink power reduction (UPR) at cell k resulting from the reduction of step 8-9 (the bitrate reduction for the connection having the highest bitrate). This UPR value is added to the ACCUMULATED POWER REDUCTION VALUE (APRV) at step 8-10. If the ACCUMULATED POWER REDUCTION VALUE (APRV) is greater than or equal to the difference D (see step 8-4), the congestion in cell k has been satisfactorily reduced for the time being to a tolerable level.

Should ACCUMULATED POWER REDUCTION VALUE (APRV) remain below the difference D as determined at step 8-11, the loop of step 8-7 through step 8-10 is again performed, this next execution of the loop likely choosing another connection at step 8-7 as the connection having the highest bitrate.

It should be understood that the steps of FIG. 8 can, and likely are, performed for each cell not controlled by source radio network controller (RNC) 222₁ but which neighbors a cell controlled by source radio network controller (RNC) 222₁, provided such neighboring cell is having congestion and requires assistance of source radio network controller (RNC) 222₁ in the control of such congestion.

As indicated above, in the example embodiments RNC INTERFERENCE MESSAGES are sent over the inter-RNC transport link 232 between neighboring exchanges (e.g., between neighboring RNCs). Preferably such messages are sent using common channel signaling. The interference measurements do not have any relation of any specific ongoing call, and therefore can be sent on any link between the neighboring exchanges.

The present invention thus permits improved call admission control for calls which are being setup near exchange borders. In this regard, as explained above, the call admission process of the present invention utilizes as input not only radio interference information in the cell where the call is setup, but also radio interference information in cells which neighbor the cell where the call is setup. The present invention provides radio interference information from neighboring cells even in situations in which the neighboring cell is controlled by another exchange, e.g., another radio network controller (RNC).

It should be understood that other types of data can be provided in an RNC MEASUREMENT MESSAGE of the present invention. Some of these other types of data may not be measured by a base station, but instead obtained by an RNC. Examples of such RNC-obtained data which can be included in an RNC MEASUREMENT MESSAGE is RNC load (such as the actual load served compared to the maximum load, e.g., in percent).

Thus, advantageously, the present invention provides improved call admission control. Moreover, the present invention tends to avoid unnecessary inter-exchange handover attempts. The load between exchanges can be evened by initiating inter-RNC handover when the load of the exchanges differs.

In addition, the present invention provides beneficial congestion control, taking into consideration congestion in a cell caused by connections which are not controlled by the RNC which controls the congested cell.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications network having a control node which controls a specified cell and which, if the control node makes a determination that call set up in the specified cell would result in an acceptable interference condition in the specified cell but cause an unacceptable condition in another cell, rejects the call setup, the determination being made with reference to cell condition information obtained from the another cell.

2. A telecommunications network having a network control node which controls a specified cell and which, if the control node makes a determination that one of call set up and call continuation in the specified cell would result in an acceptable interference condition in the specified cell but cause an unacceptable condition in another cell, performs a protective action in the specified cell to protect against the unacceptable condition in the another cell, the determination being made with reference to cell condition information obtained from a control node of the another cell.

3. A telecommunications network having a network control node which controls a specified cell and which, if the control node makes a determination that call continuation in the specified cell would result in an acceptable interference condition in the specified cell but cause an unacceptable condition in another cell, performs a modification of a call in the specified cell to protect against the unacceptable condition in the another cell, the determination being made with reference to cell condition information obtained from a control node of the another cell.

4. The telecommunications network of claim 1, 2, or 3, wherein the unacceptable condition in the another cell is determined based on measurement data taken relative to the another cell.

5. The telecommunications network of claim 1, 2, or 3, wherein the unacceptable condition in the another cell is unacceptable uplink interference in the another cell.

6. The telecommunications network of claim 1, 2, or 3, wherein the cell condition information is obtained from the another cell via a signaling message.

7. The telecommunications network of claim 6, wherein the cell condition information is uplink interference in the another cell.

8. The telecommunications network of claim 1, 2, or 3, wherein the another cell neighbors the specified cell.

9. The telecommunications network of claim 1, 2, or 3, wherein the another cell is controlled by another control node.

10. The telecommunications network of claim 9, wherein the another control node transmits the cell condition information regarding the another cell, the cell condition information being used by the control node to determine whether the unacceptable condition would be caused in the another cell.

11. The telecommunications network of claim 10, wherein the cell condition information is transmitted between control nodes using common channel signaling.

12. The telecommunications network of claim 10, wherein the cell condition information is measurement data, and wherein the signaling message includes measurement data for plural cells controlled by the another control node.

13. The telecommunications network of claim 10, wherein transmission of the signaling message occurs at the initiative of the another control node.

14. The telecommunications network of claim 10, wherein transmission of the signaling message occurs in response to a request from the control node which makes the network decision.

15. The telecommunications network of claim 10, wherein the cell condition information is related to uplink radio interference in the another cell.

16. The telecommunications network of claim 1, 2, or 3, wherein the control node is a radio network controller.

17. The telecommunications network of claim 2, wherein the protective action is rejection of call setup.

18. The telecommunications network of claim 2, wherein the protective action is modification of a call in the specified cell.

19. The telecommunications network of claim 2 or 3, wherein the modification of a call in the specified cell is bitrate reduction of a selected call in the specified cell.

20. The telecommunications network of claim 1, 2, or 3, wherein the control node determines whether the unacceptable condition would be caused based on measurement data available to the control node at a time of the determination.

21. The telecommunications network of claim 1, 2, or 3, wherein the control node determines whether the unacceptable condition would be caused in any of plural cells which neighbor the specified cell.

22. A method of operating a telecommunications network comprising:

(1) determining that a call set up decision needs to be made for a specified cell; and (2) rejecting the call set up in the specified cell if a first control node which controls the specified cell makes a determination that the call set up would result in an acceptable interference condition in the specified cell but cause an unacceptable condition in another cell, the determination being made with reference to cell condition information obtained from the another cell.

23. A method of operating a telecommunications network comprising:

(1) determining that one of a call set up and a call continuation decision needs to be made for a specified cell;

(2) using cell condition information obtained from a control node of another cell for making a determination at a network control node which controls the specified cell whether the one of call set up and call continuation in the specified cell would result in an acceptable interference condition in the specified cell but cause an unacceptable condition in the another cell; and, if so (3) performing a protective action in the specified cell to protect against the unacceptable condition in the another cell.

24. A method of operating a telecommunications network comprising:

(1) determining that one of a call set up and a call continuation decision needs to be made for a specified cell;

(2) using cell condition information obtained from a control node of another cell for making a determination at a network control node which controls the specified cell whether the one of call set up and call continuation in the specified cell would result in an acceptable condition in the specified cell but cause an unacceptable condition in the another cell; and, if so (3) performing a modification of a call in the specified cell to protect against the unacceptable condition in the another cell.

25. The method of claim 22, 23, or 24, wherein the unacceptable condition in the another cell is determined based on measurement data taken relative to the another cell.

26. The method of claim 22, 23, or 24, wherein the unacceptable condition in the another cell is unacceptable uplink interference in the another cell.

27. The method of claim 22, 23, or 24, further comprising:

sending a signaling message wit the cell condition information from the another cell; and using, as input in step (2), the cell condition information.

28. The method of claim 22, 23, or 24, wherein the cell condition information is uplink interference in the another cell.

29. The method of claim 22, 23, or 24, wherein the another cell neighbors the specified cell.

30. The method of claim 22, 23, or 24, further comprising:

controlling the another cell using an another control node.

31. The method of claim 30, further comprising:
transmitting, from the another control node to the first control node, the cell condition information regarding the another cell; and
using the cell condition information at the first control node to determine whether the unacceptable condition would be caused in the another cell.

32. The method of claim 31, wherein the cell condition information is transmitted between control nodes using a signaling message.

33. The method of claim 31, wherein the cell condition information is measurement data, and wherein the signaling message includes measurement data for plural cells controlled by the another control node.

34. The method of claim 31, further comprising transmitting the signaling message at the initiative of the another control node.

35. The method of claim 31, further comprising transmitting the signaling message in response to a request from the control node which makes the network decision.

36. The method of claim 31, wherein the cell condition information is related to uplink radio interference in the another cell.

37. The telecommunications network of claim 23, wherein the protective action is rejection of call setup.

38. The telecommunications network of claim 23, wherein the protective action is modification of a call in the specified cell.

39. The method of claim 38 or 24, wherein the modification of a call in the specified cell is bitrate reduction of a selected call in the specified cell.

40. The method of claim 22, 23, or 24, wherein determination of step (2) is performed based on measurement data available to the control node at a time of the determinations.

41. The method of claim 22, 23, or 24, wherein step (2) involves determining whether the unacceptable condition would be caused in any of plural cells which neighbor the specified cell.

42. A method of operating a telecommunications network comprising:
(1) determining that one of a call set up and a call continuation decision needs to be made for a specified cell which is controlled by a network first control node;
(2) performing an uplink interference measurement for another cell which is controlled by a second control node;
(3) transmitting cell condition information for the another cell including the uplink interference measurement from the second control node to the first control node;
(4) using cell condition information obtained from another cell for making a determination at the first control node whether the one of call set up and call continuation in the specified cell would result in an acceptable condition in the specified cell but cause an unacceptable condition in the another cell; and, if so
(5) performing a protective action to protect against the unacceptable condition in the another cell.

43. The method of claim 42, wherein the protective action is rejection of call setup.

44. The method of claim 42, wherein the protective action is modification of a call in the specified cell.

45. The method of claim 44, wherein the modification of a call in the specified cell is bitrate reduction of a selected call in the specified cell.

46. A telecommunications network comprising:
a network first control node which controls a specified cell;
a network second control node which controls another cell;
wherein the second control node sends to the first control node cell condition information including an uplink interference measurement for the another cell;
wherein the first control node uses the cell condition information to makes a determination whether one of call set up and call continuation in the specified cell would result in an acceptable condition in the specified cell but cause an unacceptable condition in another cell; and
wherein the first control node performs a protective action to protect against the unacceptable condition in the another cell.

47. The apparatus of claim 46, wherein the protective action is rejection of call setup.

48. The apparatus of claim 46, wherein the protective action is modification of a call in the specified cell.

49. The apparatus of claim 48, wherein the modification of a call in the specified cell is bitrate reduction of a selected call in the specified cell.

* * * * *